April 2, 1968  B. R. KLINKE  3,376,020
MECHANICAL INTERLOCK SYSTEM FOR HOISTING MACHINERY
Filed Aug. 9, 1965 4 Sheets-Sheet 1
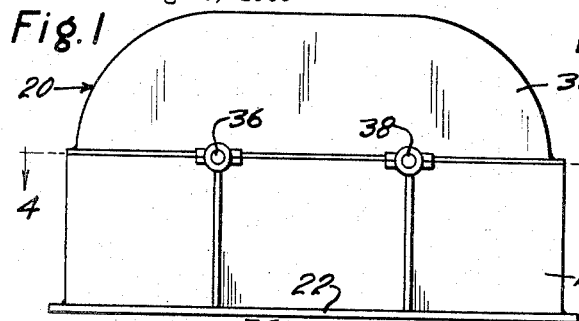
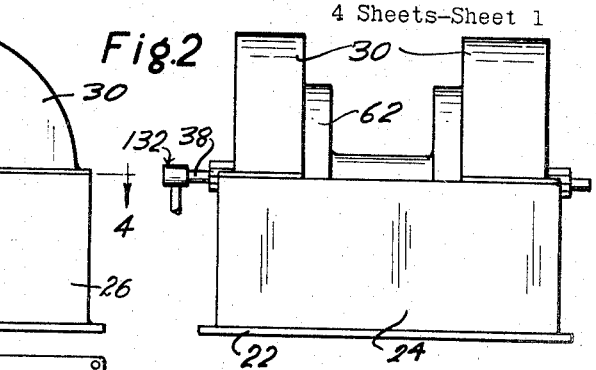
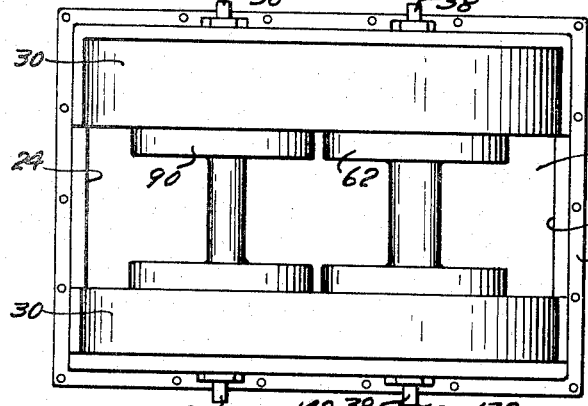
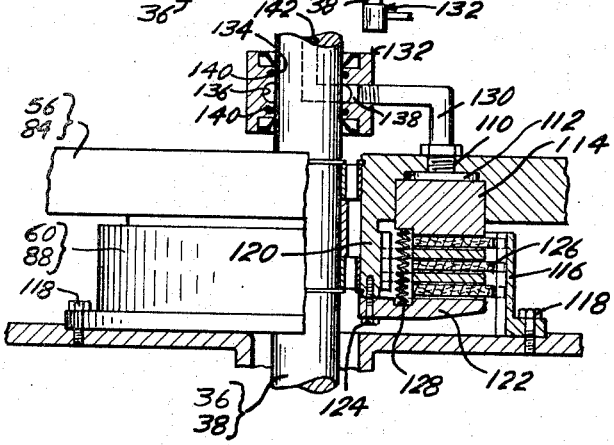
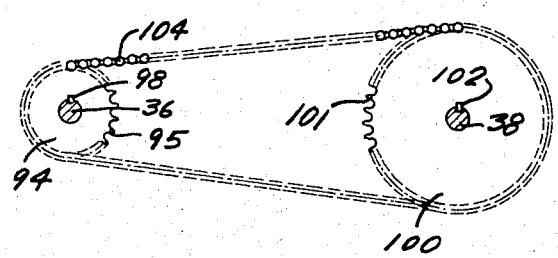
INVENTOR.
Bernhard R. Klinke
BY
TW Secrest April 2, 1968   B. R. KLINKE   3,376,020
MECHANICAL INTERLOCK SYSTEM FOR HOISTING MACHINERY
Filed Aug. 9, 1965   4 Sheets-Sheet 2

INVENTOR.
Bernhard R. Klinke
BY TW Searest

April 2, 1968     B. R. KLINKE     3,376,020
MECHANICAL INTERLOCK SYSTEM FOR HOISTING MACHINERY
Filed Aug. 9, 1965     4 Sheets-Sheet 3
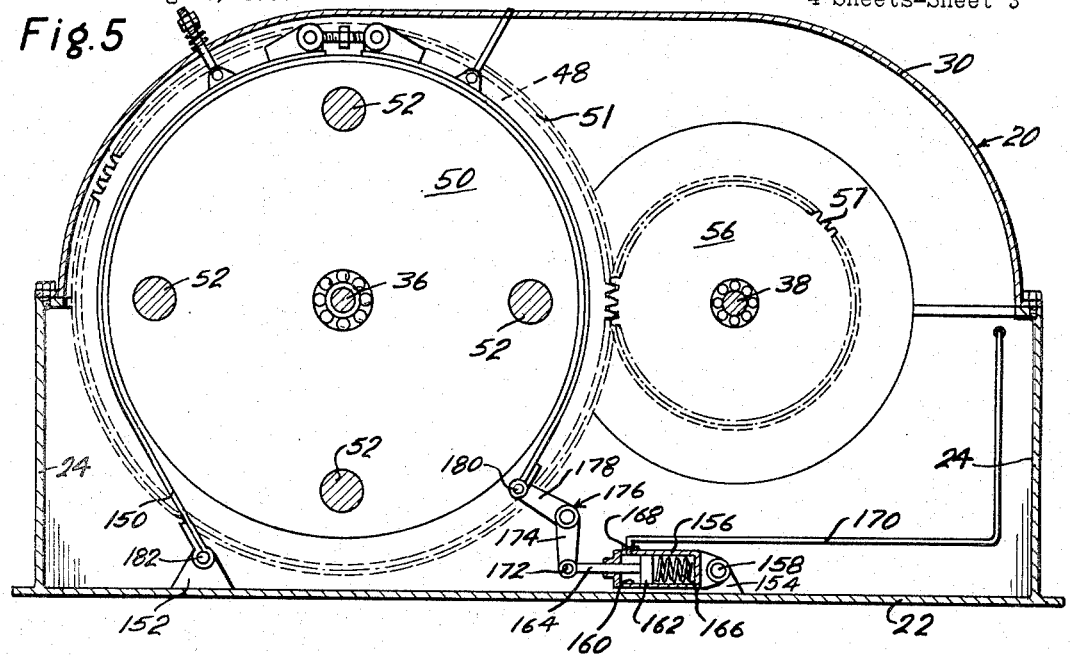
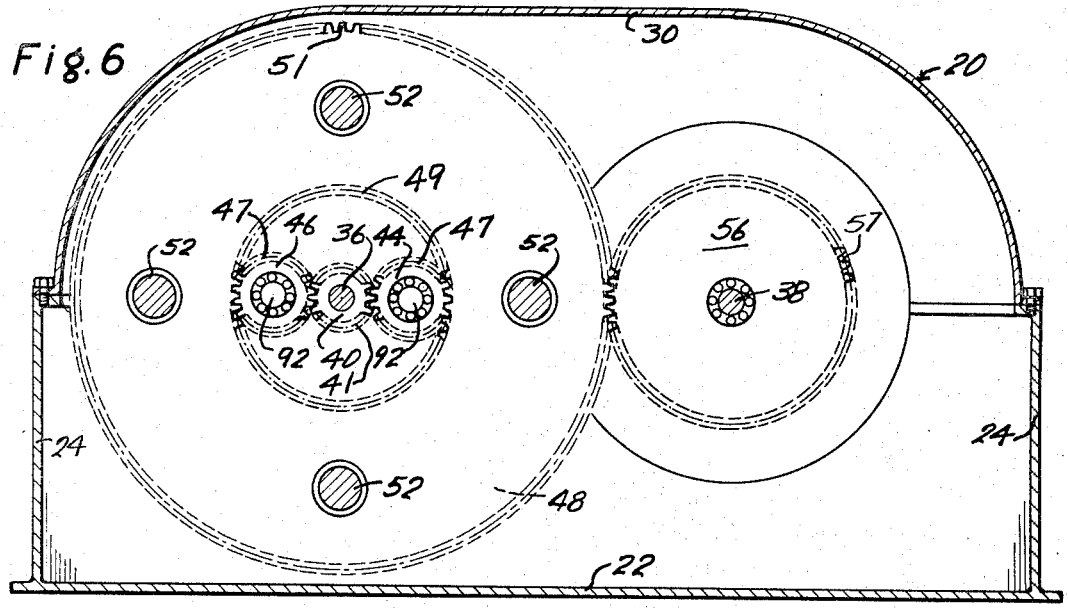
INVENTOR.
Bernhard R. Klinke
BY
TW Secrest April 2, 1968  B. R. KLINKE  3,376,020

MECHANICAL INTERLOCK SYSTEM FOR HOISTING MACHINERY

Filed Aug. 9, 1965  4 Sheets-Sheet 4

INVENTOR.
Bernhard R. Klinke
BY
V W Secrest

United States Patent Office 3,376,020
Patented Apr. 2, 1968

3,376,020
MECHANICAL INTERLOCK SYSTEM FOR
HOISTING MACHINERY
Bernard R. Klinke, Seattle, Wash., assignor to Smith-Berger Manufacturing Corporation, Seattle, Wash.
Filed Aug. 9, 1965, Ser. No. 478,288
10 Claims. (Cl. 254—185)

This invention is for a mechanical interlock system for hoisting machinery and which system eliminates slipping devices with the result that all of the power supplied to the hoisting machinery is used for hoisting purposes.

In a logging operation there is employed a yarder for conveying or pulling a log to the loading yard. In this operation there is used a spar tree. The yarder has an outgoing cable and an incoming cable. Both of these cables pass over the spar tree.

To haul in the log, there have been developed different types of yarders. These yarders use slipping devices such as slipping brakes or slipping clutches to develop tension on the cables. Naturally, with such slipping devices, a great deal of power is wasted in the form of heat. In fact, a yarder having four hundred horsepower input may actually utilize only two hundred horsepower as the difference is consumed in heat because of the slipping devices.

In the yarder there are two drums. One drum carries the incoming cable; this drum is powered; and, the second drum carries the outgoing cable. The outgoing cable is pulled out by a powered drum and the incoming cable. Both the incoming cable and the outgoing cable are connected and run over a tail block. The tail block is mounted a certain distance from the yarder. The outgoing cable, the tail block, the incoming cable, and the two drums may be considered to be the equivalent of an endless cable system. In use in a logging operation, such a yarder has an incoming line which passes over the tail block and, then, becomes an outgoing line. On the incoming line there is attached a log. If the log were dragged on the ground, the log would hang-up on stumps or snags, create a great deal of friction, damage the ground, and—what is more important—would damage the log. By using the spar tree and the tail block and by letting out more outgoing line from the outgoing drum, the incoming line is then being taken up by the incoming drum; and, the log, which is attached to the incoming cable, is elevated off the ground and is easier to handle in an elevated position. The drum on which the outgoing cable or haulback cable is wound, may be held in a fixed position or may be made to rotate at less speed than the main drum so that greater tension is created in both the incoming line and the outgoing line. One way of holding the haulback drum motionless or letting it rotate at less speed than the main drum, is by the use of brakes. As previously explained, the brakes are a slipping device and waste incoming power to the drum. In addition to this wasting of power, the brakes rapidly wear out; and, it is necessary to stop the yarder and replace the brakes.

Another way of obtaining cable tension or an interlock with the outgoing cable is to power the outgoing cable at a speed slightly lower than the speed of the incoming cable. The difference between the geared line speed and the actual incoming line speed has to be taken up by slipping a clutch or a brake. On multiple layer drums, the difference in line speed between geared outgoing and powered incoming cables is increasing as one drum can be bare and the other drum full. This is a condition of varying line speed and drum rotational speed. With this system, the present interlock systems are geared correctly for one instantaneous moment because of the use of fixed gearing. The rest of the remaining cycle, where the interlock is caused by fixed gearing, it is not correct and has to be corrected by using slipping devices. Again, these slipping devices create heat and represent a loss in power supplied to the yarder. In addition, there is wear on the slipping devices and downtime of the yarder for replacing the worn slipping devices.

In this invention I have provided a mechanical interlock system, which may be used on yarders, where slipping devices are not used to slow the rotational speed of the haulback drum with respect to the rotational speed of the main drum. Instead, the power delivered to the haulback drum is used to assist the main drum in pulling in the incoming cable. Accordingly, an object of this invention is the provision of a variable and self-adjusting drum ratio between two drums for paying out and hauling in cable; a correct drum ratio for any two drums for any given difference in drum diameters with said difference including the difference created by the cable on the drum; provision of a mechanical interlock system whereby it is possible to change the interlock ratio without controls; elimination of slipping devices as previously used on conventional yarders, winches and hoisting machinery; utilization of all input power without loss of power through slipping devices; elimination of special interlock shaft required on presently used conventional yarders, winches and hoisting machinery; elimination of reverse gearing in gearbox which is required on present interlock models without special interlock shaft; elimination of intermediate shafts used on prior conventional yarders; provision of a mechanical interlock system which is one hundred percent power regenerative as all the power for line tensioning is fed back into the system; provision of an interlock system which can be used in connection with more than two drums and can be applied to different winches, yarders, hoists and other machinery; provision of an interlock system which requires less space and weight than prior conventional interlock systems; the provision of an interlock system whereby the operator does not need a special skill to operate the interlock system; provision of an interlock system and the regeneration of power which is accomplished by a planetary drive; provision of an interlock system which can be converted to the use of a single drum by locking a big sun gear; and, the provision of a mechanical interlock system for use on yarders and which yarders require less input power to accomplish the same purpose as previously used yarders based on the principle of a slipping device. These and other important objects and advantages of the invention will be more particularly brought forth upon reference to the accompanying drawings, the detailed specification of the invention, and the appended claims.

In the drawings:

FIGURE 1 is a side elevational view of a yarder employing the mechanical interlock system of this invention;

FIGURE 2 is an end elevational view of a yarder using the mechanical interlock system of this invention;

FIGURE 3 is a plan view of a yarder using the mechanical interlock system of this invention;

Figure 4:
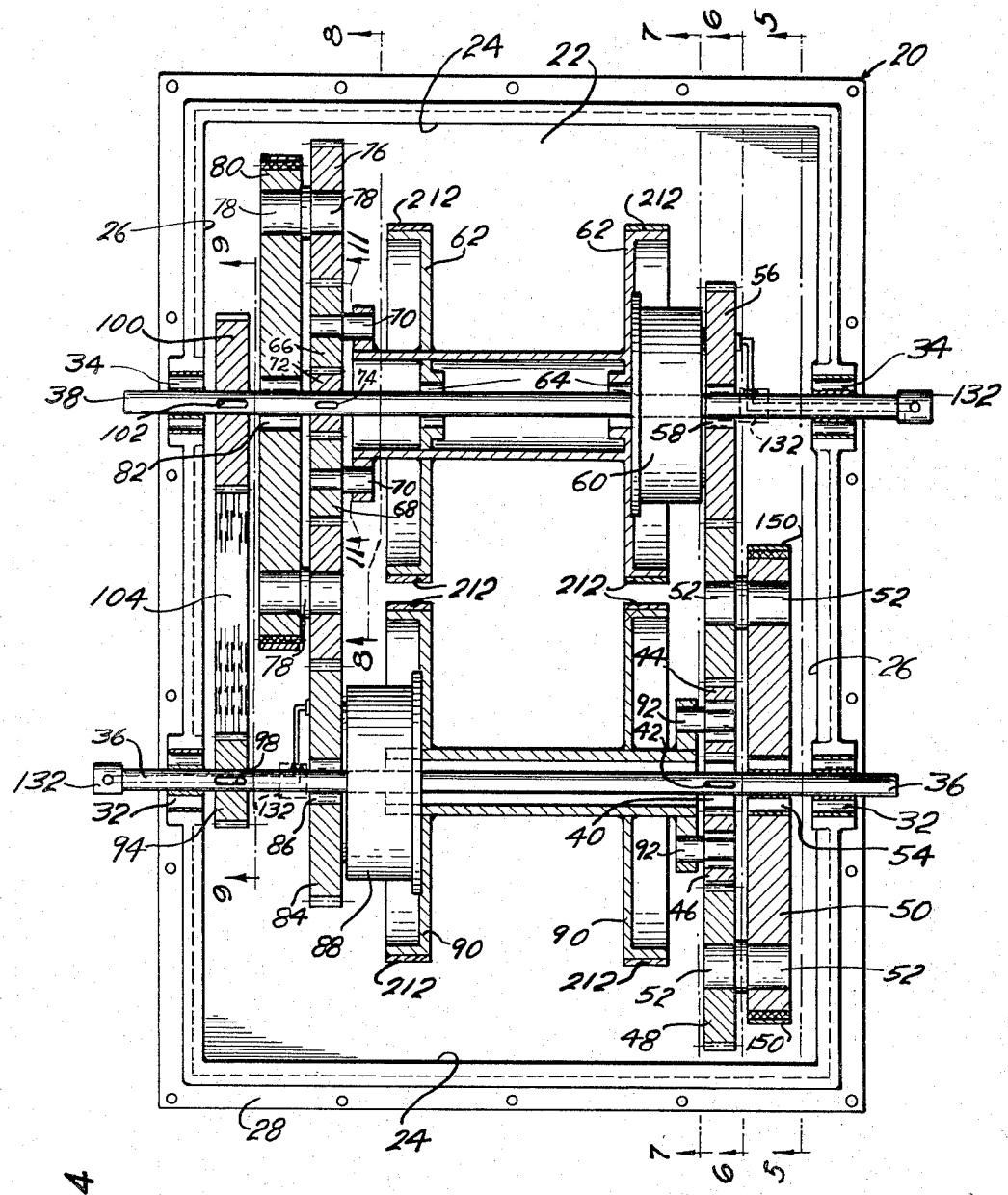
FIGURE 4 is a plan view of a yarder constructed in accordance with the preferred teachings of this invention and illustrates some of the components in cross section to more particularly bring forth the mechanical interlock system.
Figure 11:
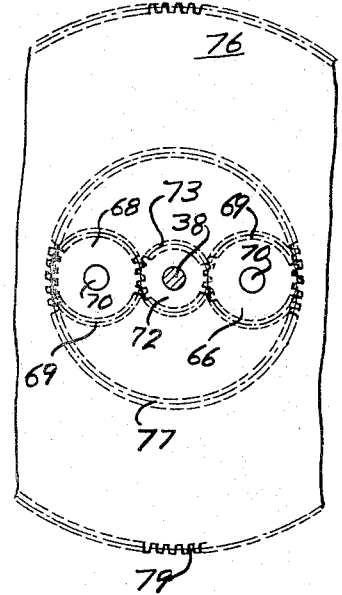
Figure 8:
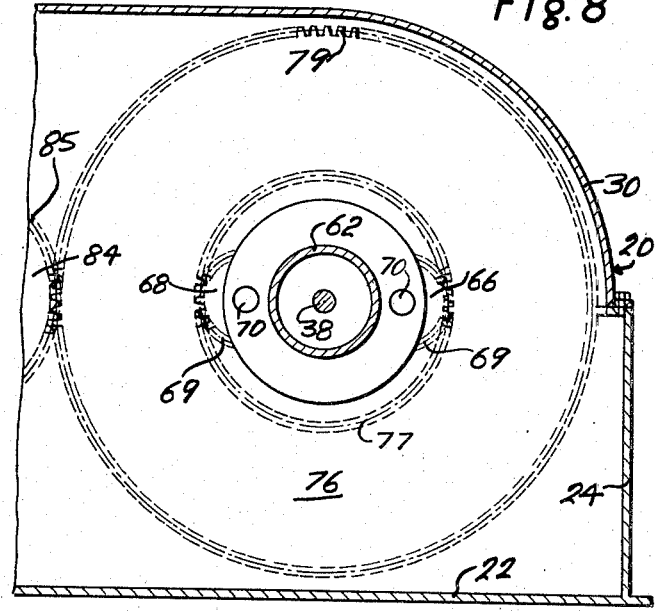
Figure 7:
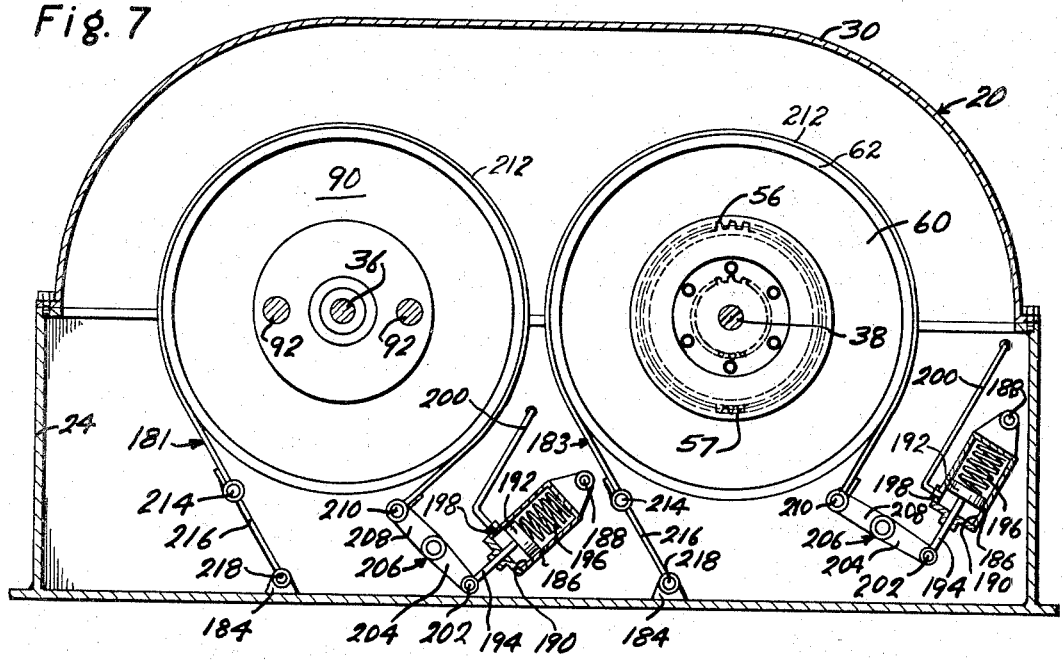

FIGURE 5, taken on line 5—5 of FIGURE 4, is a view showing the carrier for the sun gear of this mechanical interlock system;

FIGURE 6, taken on line 6—6 of FIGURE 4, shows the pinion gear or sun gear, planetary gears, the ring gear and the clutch gear of this mechanical interlock system;

FIGURE 7, taken on line 7—7 of FIGURE 4, shows a first drum and clutch, and a second drum;

FIGURE 8, taken on line 8—8 of FIGURE 4, shows a ring gear and portions of planetary gears;

FIGURE 9, taken on line 9—9 of FIGURE 4, shows sprockets and a chain drive between two sprockets;

FIGURE 10 is a fragmentary cross-sectional view of the clutch and shows details of construction of the clutch;

FIGURE 11, taken on line 11—11 of FIGURE 4, shows a pinion gear, planetary gears and the ring gear.

In the drawings it is seen that the invention comprises a yarder 20 having a bottom 22, ends 24, and sides 26. On the upper part of the ends 24 and sides 26, there is a circumscribing flange 28. There are two spaced-apart covers 30 for protecting some of the gearing of the yarder 20. In FIGURES 1, 2 and 3, these two spaced-apart covers 30 are illustrated as being along the sides of the winch 20.

In the sides 26 there are two sets of bearings. There is a first set of aligned bearings 32, one bearing in each side. Also, there is a second set of aligned bearings 34, one bearing in each side. A first shaft 36 is journaled in the first set of bearings 32. A second shaft 38 is journaled in the second set of bearings 34.

On the first shaft 36 there is keyed; by key 42, a first pinion sun gear 40 having gear teeth 41. There is a first set of planetary gears comprising gears 44 and 46 and having gear teeth 47. These gears 44 and 46 mesh with the pinion sun gear 40. Then, there is a first ring gear 48 which meshes with the first set of planetary gears 44 and 46. The ring gear 48 connects with a first ring gear support 50 by means of jackshafts or pins 52, and has an inside ring of gear teeth 49 and an outside ring of gear teeth 51. The first ring gear support 50 is positioned on the first shaft 36 by means of bearings 54. The first ring gear support 50 is positioned between the side 26 of the yarder 20 and the first ring gear 48.

On the second shaft 38 there is a first clutch gear 56. The first clutch gear 56 is journaled on the shaft 38 by means of bearings 58, meshes with the first ring gear 48, and has gear teeth 57. The first clutch gear 56 connects with a first clutch 60. The first clutch 60 connects with a second drum or main drum 62. The drum 62 is journaled on the shaft 38 by bearings 64.

The drum 62 connects with a second set of planetary gears 66 and 68 having gear teeth 69. The second set of planetary gears 66 and 68 connect with the second drum 62 by means of jackshafts or pins 70. Also, the gears 66 and 68 mesh with a second pinion sun gear 72 having gear teeth 73. The second pinion sun gear 72 is keyed to shaft 38 by means of key 74. The gears 66 and 68 mesh with a second ring gear 76 having an inside ring of gear teeth 77 and an outside ring of gear teeth 79. The second ring gear 76 connects by means of jackshafts or pins 78 with a second ring gear support 80. The second ring gear support 80 is journaled on the second shaft 38 by means of bearings 82. The second ring gear 76 meshes with a second clutch gear 84 having gear teeth 85. The second clutch gear 84 is journaled on the first shaft 36 by means of bearings 86. The second clutch gear 84 connects with a second clutch 88. The second clutch 88 connects with a first drum or a haulback drum 90. Also, the first drum 90 connects by means of jackshafts or pins 92 with the first set of planetary gears 44 and 46.

On the first shaft 36 there is a first sprocket 94 having teeth 95. This sprocket 94 is positioned between the second clutch gear 84 and the side 26. The first sprocket 94 is keyed to the first shaft by key 98. On the second shaft 38 there is a second sprocket 100 having teeth 101. The second sprocket 100 is between the second ring gear support 80 and the side 26, and is keyed to the second shaft 38 by means of key 102. An endless chain 104 passes over the sprockets 94 and 100.

The two clutches 60 and 88 may be of a conventional construction and commercially available. In FIGURE 10 there is illustrated a detailed construction of these clutches. In a respective clutch gear 56 and 84, there is a tapped passageway 110, on that side of the clutch gear away from the clutch. The passageway 110 connects with a chamber 112. In the chamber 112 there is a piston 114. The clutch comprises a driving ring 116 which is attached by means of bolts 118 to the flange of the drum 62 or 90. The clutch gear has a hub 120. On the inner end of the hub 120, there is attached a circular bearing plate 122 by means of bolts 124. Positioned in between the piston 114 and the bearing plate 122 are clutch plates 126. A spring 128 pushes away the piston 114 from the clutch plates 126 and, also, from the bearing plate 122. The chamber 112 is connected to a source of fluid pressure by means of a tube 130. The tube 130 connects with a rotating fluid couple 132. This rotating fluid couple 132 may be of a cylindrical construction having a longitudinal passageway 134. The passageway 134 connects with a circular passageway 136. The circular passageway 136 connects with a tapped radial passageway 138. The tube 130 is positioned in both the tapped passageway 138 and the tapped passageway 110. There are two spaced-apart O-rings 140 or sealing elements on each side of the circular passageway 136 to prevent the loss of fluid. In the shaft, either 36 or 38, there is a passageway 142. The passageway 142 connects with the circular passageway 136. Also, not shown, is a source of fluid pressure, either pneumatic or hydraulic, for moving the piston 114 and, also, the clutch plates 126.

In FIGURE 4 it is seen that on the end of the shaft 38 there is a rotating coupling 132; and, also, on the end of the shaft 36 there is a rotating coupling 132 for allowing the fluid to enter in the passageway 142 on the shaft.

On the periphery of the first ring gear support 50 there is positioned a brake band 150. In FIGURE 5 it is seen that, on the upper base of the base 22, there is a flange 152 and a flange 154: one flange on each side of the first shaft 36. A fluid actuated cylinder 156 is pinned by pin 158 to the flange 154. This fluid actuated cylinder 156 has a cylindrical chamber 160. In this chamber 160 there is positioned a piston 162 having an outwardly directed plunger 164. A spring 166 is in the chamber 160 to direct the piston 162 and the plunger 164 outwardly. There is an inlet passageway 168 near the free end of the cylinder 156. This inlet passageway 168 receives a pipe or tube 170 which connects with a source of fluid pressure such as a pneumatic or hydraulic source of pressure. The plunger 164 is pinned by pin 172 to a first arm 174 of the bell crank 176. The second arm 178 of the bell crank is pinned at 180 to one end of the brake band 150. The other end of the brake band 150 is pinned at 182 to the flange 152. As is readily appreciated, by increasing the fluid pressure in the cylinder 156, the piston 162 and the plunger 164 are moved inwardly in the cylinder 156 so as to rotate the arm 178 downwardly so as to move the brake band 150 against the carrier 50. In this manner the rotational movement of the carrier 50 is slowed or stopped. Conversely, by lowering the fluid pressure in the cylinder 156, the spring 168 moves the piston 162 and the plunger 164 outwardly so that the brake band 150 does not firmly contact the periphery of the carrier 50.

In FIGURE 7 there is illustrated a braking system for the first drum 90 and a braking system for the second drum 62. The braking system for the first drum 90 will be referred to by reference numeral 181, and the braking system for the second drum 62 will be referred to by the reference numeral 183. The components of these two braking systems are the same; and, therefore, the same reference numerals will be used for all similar components. On the upper surface of the bottom 22 there is a flange 184. A fluid actuated cylinder 186 is pinned by pin 188 to a suitable support or wall. The fluid actuated cylinder 186 comprises a chamber 190 in which there is positioned a piston 192 having an outwardly directed plunger 194. A spring 196 is positioned between the inner base of the piston 192 and the end of the cylinder 186 so as to urge outwardly the piston 192 and the plunger 194. In the wall of the cylinder 186, near the free end thereof, there is a passageway 198. A line or tube 200 connects with this passageway 198 and the interior of the cylinder 186 and, also, with the source of fluid pressure such as a pneumatic source or a hydraulic source of pressure. The plunger 194 connects by means of a pin 202 with a first arm 204 of a bell crank 206. A second arm 208 of the bell crank 206 connects by means of a pin 210 with one end of a brake band 212. The other end of the brake band 212 connects by means of a pin 214 with a tie member 216. The tie member 216 connects by means of a pin 218 with a flange 184. As is readily appreciated by increasing the fluid pressure inside the cylinder 186, the piston 192 and the plunger 194 are forced inwardly in the cylinder 186 so as to rotate the bell crank 206 to tighten the brake band 212 on the drum. In this manner the rotational speed of the drum may be decreased or stopped. Conversely, by decreasing the fluid pressure in the cylinder 186, the spring 196 moves the piston 192 and the plunger 194 outwardly so that the brake band 212 does not tightly contact the drum so as to allow it to rotate.

An example of the hauling in of a log by the yarder 20 and an example of the paying out of the line prior to hauling in a log will be presented.

The yarder 20 may be considered as comprising a first gear train having a first pinion sun gear 40, a first set of planetary gears 44 and 46, a first ring gear 48 and a first clutch gear 56. Also, the yarder 20 has a second gear train comprising the second pinion sun gear 72, the second set of planetary gears 66 and 68, the second ring gear 76, and the second clutch gear 84.

The gear ratio of the powered-in drum to the powered-out drum must be greater than unity. When this ratio is greater than unity, the reaction force or the energy of the reaction of a powered-out drum is fed back through the gear train to the powered-in drum. This is to be contrasted with prior conventional yarders wherein a slipping device, such as a brake, is used to slow the rotation of the powered-out drum. By using such a slipping device, the energy of the powered-out drum is converted into heat energy and is dissipated or lost. Naturally, some of the power to the yarder is wasted or burned up as heat energy. In my system, it is not necessary to use a slipping device on the powered-out drum; and, therefore, there is not a waste of energy through the slipping device.

I refer to this gear ratio as the driving ratio of the powered-in drum to the powered-out drum and express it as follows:

$$\text{First gear ratio} = \frac{\text{Pinion sun gear (No. teeth)} + \text{Ring gear (No. inside teeth)}}{\text{Pinion sun gear (No. teeth)}}$$

$$\text{Second gear ratio} = \frac{\text{Ring gear (No. inside teeth)}}{\text{Pinion sun gear (No. teeth)}} \times \frac{\text{Clutch gear (No. teeth)}}{\text{Ring gear (No. outside teeth)}}$$

$$\text{Driving ratio} = \frac{\text{First gear ratio}}{\text{Second gear ratio}}$$

An example of the driving ratio, assume:
 Pinion sun gear number of teeth=20
 Ring gear, number inside teeth=80
 Ring gear, number outside teeth=160
 Clutch gear, number teeth=60

$$\text{First gear ratio} = \frac{20+80}{20} = 5$$

$$\text{Second gear ratio} = \frac{80}{20} \times \frac{60}{180} = \frac{4}{3}$$

$$\text{Driving ratio} = \frac{5}{4/3} = \frac{15}{4} = 3.75$$

In the above there was presented an example of a gear train having the given number of teeth for the pinion sun gear, the ring gear—both inside and outside teeth, and the clutch gear. This may be considered to be typical for such a yarder. Of course, the number of teeth on these gears may be varied for the particular operations.

In an example of the hauling in of a log by the yarder 20, the main drum is the drum 62 and the haulback drum is the drum 90. The cable, which is being pulled in and which is pulling in the log, is wound on the drum 62. The cable is being paid out from the drum 90. In this situation, the first clutch 60 is disengaged and the second clutch 88 is engaged. Also, the first ring gear 48 is free wheeling under these circumstances. Either end of the first shaft 36 or either end of the second shaft 38 may be connected to a source of power such as the output shaft of an electric motor or the output shaft of a reciprocating engine or other suitable means for powering the yarder 20. If the power is introduced into the yarder 20 through the shaft 36, then this power is transferred to the shaft 38 through the gears or sprockets 94 and 100 and the chain 104, and from the shaft 38 to the second pinion gear 72. If the power is introduced directly into the yarder 20 through the shaft 38, then the power is also transferred to the second pinion sun gear 72.

The cable connects with both drums 62 and 90 and may be wrapped around both drums 62 and 90. The power to rotate the drum 62 is supplied through the shaft 38. The drum 62 is referred to as the powered-in drum and the drum 90 is referred to as the powered-out drum. With the cable being wound onto the drum 62 the cable is being unwound from the drum 90 so as to establish a reaction force from the drum 90 to the drum 62.

In the operation of hauling in the log, the second drum 62 rotates so as to haul in the cable. For the purpose of illustration, assume that the second drum 62 rotates in a clockwise manner. Then, the second pinion sun gear 72 rotates in a clockwise manner. Then, the second set of planetary gears 66 and 68 rotate with the carrier in a clockwise manner, and the second ring gear 76 rotates in a counterclockwise manner. Then, the second clutch gear 84 will rotate in a clockwise manner to rotate the first drum 90 in a clockwise manner. Remember, the second clutch 88 is engaged while the first clutch 60 is disengaged. With the rotation of the first drum 90 in a clockwise manner, the first drum also tends to haul in cable. The first drum 90 hauls in cable until the slack in the cable is taken up or there is no more slack. Since the second drum 62 is the powered-in drum and the first drum 90 is the powered-out drum, the second drum 62 prevails over the first drum 90. At this time, the second ring gear 76 ceases to rotate in a counterclockwise manner, but rotates in a clockwise manner. With the rotation of the second ring gear 76 in a clockwise manner, the second clutch gear 84 rotates in a counterclockwise manner. The reaction force or the reaction energy of the first drum 90 is fed through the gear train comprising the second clutch gear 84, the second ring gear 76, the second set of planetary gears 66 and 68, and the second pinion sun gear 72 to the second drum 62. Instead of having to dissipate this reaction force through a slipping device and heat energy, the reaction force can be directly fed into the drum which is hauling in the cable.

In order to haul in the next log, it is necessary to pay out cable from the second drum 62. As is well known, the tongs or other carrying means are attached to the cable and have brought in a log to the yard. Now, before the cable and tongs or other carrying means can bring in the next log, it is necessary to pay out the cable and the tongs to the position of the log. In this instance, the first clutch 60 is engaged and the second clutch 88 is disengaged. The power to the first drum 90 may come in on either end of the first shaft 36 or either end of the second shaft 38. If the power comes in on the second shaft 38, then this power is transferred through the sprocket 100, the chain 104 and the sprocket 94 to the first shaft 36. If the power comes in on the first shaft 36, it is not necessary to transfer this power. With the second clutch 88 disengaged, then the second ring gear 76 is free wheeling.

Again, the cable connects with both drums 62 and 90 and may be wrapped around both drums 62 and 90. The power to rotate the drum 90 is supplied through the shaft 36. The drum 90 is referred to as the powered-in drum and the drum 62 is referred to as the powered-out drum. With the cable being wound onto the drum 90 the cable is being unwound from the drum 62 so as to establish a reaction force from the drum 62 to the drum 90.

In the paying out of the cable from the second drum 62, assume that the first drum 90 rotates in a clockwise manner. The power is on the shaft 36 and is transferred to the first pinion sun gear 40 which rotates in a clockwise manner. The first set of planetary gears 44 and 46 rotate in a clockwise manner and the first drum 90 rotates in a clockwise manner. The first ring gear 48 rotates in a counterclockwise manner; and, therefore, the first clutch gear 56 rotates in a clockwise manner. The second drum 62 rotates in a clockwise manner. Remember, the first clutch 60 is engaged and the second clutch 88 is disengaged. With the rotation of the second drum 62 in a clockwise manner, the second drum also tends to haul in cable along with the first drum 90. The second drum 62 hauls in cable until the slack in the cable is taken up or there is no more slack. Since the first drum 90 is the powered-in drum and the second drum 62 is the powered-out drum, the first drum 90 prevails over the second drum 62. At this time the first ring gear 48 ceases to rotate in a counterclockwise manner, but rotates in a clockwise manner. With the rotation of the first ring gear 48 in a clockwise manner, the first clutch gear 56 rotates in a counterclockwise manner. The reaction force or the reaction energy of the second drum 62 is fed through the gear train comprising the first clutch gear 56, the first ring gear 48, the first set of planetary gears 44 and 46, and the first pinion sun gear 40 to the first drum 90. Instead of having to dissipate this reaction force through a slipping device and heat energy, the reaction force can be directly fed into the drum which is hauling in the cable, i.e., the cable is being payed out from the second drum 62 and is being hauled in to the first drum 90 so as to move the tong or other carrying means to the location of the next log to be hauled in.

There are brake bands associated with the carrier and, also, with the drums. These brake bands are to stop the rotation of the ring gears and the drums, and are not for slipping purposes to dissipate energy as prior conventional winches. From the foregoing it is seen that I have provided a winch which requires less maintenance than prior conventional winches as the brake bands do not need to be replaced as frequently in my winch as in prior conventional winches; and, needs less power input for hauling in a log as the reaction energy is fed back into the system and is not dissipated in the form of heat through slipping devices. Also, the drum brake bands are to stop the rotation of the drums at the landing, and the carrier brake band is for converting my yarder to a conventional yarder without using the interlock.

What I claim is:

1. A mechanical interlock system, said system comprising:
   (a) a first shaft and a second shaft;
   (b) said first and second shafts being spaced apart;
   (c) a first gear keyed to said first shaft;
   (d) a first set of planetary gears meshing with said first gear;
   (e) a first ring gear meshing with said first set of planetary gears;
   (f) a first ring gear support journaled on said first shaft;
   (g) said first ring gear support and said first ring gear being connected;
   (h) a first drum on said first shaft;
   (i) said first drum and said first set of planetary gears being connected;
   (j) a first gear on the second shaft;
   (k) a second drum on the second shaft;
   (l) means connecting the first gear on the second shaft and the second drum;
   (m) gear means between said first gear on the second shaft and said first set of planetary gears;
   (n) a cable between said first and second drums; and,
   (o) when said cable is being wound on the first drum said cable provides a reaction energy to the second drum and which reaction energy is channelled from the second drum through the first gear on the second shaft, said gear means, and said first set of planetary gears to the first drum to assist the first drum in the winding of the cable onto the first drum.

2. A mechanical interlock system, said system comprising:
   (a) a first shaft and a second shaft;
   (b) said first and second shafts being spaced apart;
   (c) a first gear keyed to said first shaft;
   (d) a first set of planetary gears meshing with said first gear;
   (e) a first ring gear meshing with said first set of planetary gears;
   (f) a first ring gear support journaled on said first shaft;
   (g) said first ring gear support and said first ring gear being connected;
   (h) a first drum on said first shaft;
   (i) said first drum and said first set of planetary gears being connected;
   (j) a first gear on the second shaft;
   (k) a second drum on the second shaft;
   (l) means connecting the first gear on the second shaft and the second drum;
   (m) gear means between said first gear on the second shaft and said first set of planetary gears;
   (n) a cable between said first and second drums;
   (o) when said cable is being wound on the first drum said cable provides a reaction energy to the second drum and which reaction energy is channelled from the second drum through the first gear on the second shaft, said gear means, and said first set of planetary gears to the first drum to assist the first drum in the winding of the cable onto the first drum; and,
   (p) the driving ratio of the first drum to the second drum being greater than unity.

3. A mechanical interlock system, said system comprising:
   (a) a first shaft and a second shaft;
   (b) said first and second shafts being spaced apart;
   (c) a first gear keyed to said first shaft;
   (d) a first set of planetary gears meshing with said first gear;
   (e) a first ring gear meshing with said first set of planetary gears;

3,376,020

(f) a first ring gear support journaled on said first shaft;
(g) said first ring gear support and said first ring gear being connected;
(h) a first drum on said first shaft;
(i) said first drum and said first set of planetary gears being connected;
(j) a first clutch gear on the second shaft;
(k) a second drum on the second shaft;
(l) a first clutch on the second shaft;
(m) said first clutch connecting with the first clutch gear and the second drum;
(n) gear means between said first clutch gear and said first set of planetary gears;
(o) a cable between said first and second drums; and
(p) when said cable is being wound on the first drum said cable provides a reaction energy to said second drum and which reaction energy is channelled from the second drum through the first clutch, the first clutch gear, said gear means and said first set of planetary gears to the first drum to assist the first drum in the winding of the cable onto the drum.

4. A mechanical interlock system, said system comprising:
(a) a first shaft and a second shaft;
(b) said first and second shafts being spaced apart;
(c) a first gear keyed to said first shaft;
(d) a first set of planetary gears meshing with said first gear;
(e) a first ring gear meshing with said first set of planetary gears;
(f) a first ring gear support journaled on said first shaft;
(g) said first ring gear support and said first ring gear being connected;
(h) a first drum on said first shaft;
(i) said first drum and said first set of planetary gears being connected;
(j) a first clutch gear on the second shaft;
(k) a second drum on the second shaft;
(l) a first clutch on the second shaft;
(m) said first clutch connecting with the first clutch gear and the second drum;
(n) gear means between said first clutch gear and said first set of planetary gears;
(o) a cable between said first and second drums;
(p) when said cable is being wound on the first drum said cable provides a reaction energy to said second drum and which reaction energy is channelled from the second drum through the first clutch, the first clutch gear, said gear means, and said first set of planetary gears to the first drum to assist the first drum in the winding of the cable onto the first drum; and,
(q) the driving ratio of the first drum to the second drum being greater than unity.

5. A mechanical interlock system, said system comprising:
(a) a first shaft and a second shaft;
(b) said first and second shafts being spaced apart;
(c) a first gear keyed to said first shaft;
(d) a first set of planetary gears meshing with said first gear;
(e) a first ring gear meshing with said first set of planetary gears;
(f) a first ring gear support journaled on said first shaft;
(g) said first ring gear support and said first ring gear being connected;
(h) a first drum on said first shaft;
(i) said first drum and said first set of planetary gears being connected;
(j) a first clutch gear on the second shaft;
(k) a second drum on the second shaft;
(l) a first clutch on the second shaft;
(m) said first clutch connecting with the first clutch gear and the second drum;
(n) said first clutch gear and said first ring gear meshing with each other;
(o) said first drum being the powered-in drum;
(p) said second drum being the powered-out drum;
(q) the driving ratio of the powered-in drum to the powered-out drum being greater than unity;
(r) a cable between said first and second drums; and,
(s) when said cable is being wound on the first drum said cable provides a reaction energy to the second drum and which reaction energy is channelled from the second drum, through the first clutch, the first clutch gear, the first ring gear, and the first set of planetary gears to the first drum to assist the first drum in the winding of the cable onto the first drum.

6. A mechanical interlock system, said system comprising:
(a) a first shaft and a second shaft;
(b) said first and second shafts being spaced apart and parallel;
(c) a first sprocket keyed to the first shaft;
(d) a second sprocket keyed to the second shaft;
(e) a chain connecting the first and second sprockets;
(f) a first gear keyed to said first shaft;
(g) a first set of planetary gears meshing with said first gear;
(h) a first ring gear meshing with said first set of planetary gears;
(i) a first ring gear support journaled on said first shaft;
(j) said first ring gear support and said first ring gear being connected;
(k) a first drum on said first shaft;
(l) a second drum on the second shaft;
(m) a first clutch gear on the second shaft;
(n) said first drum and said first set of planetary gears being connected;
(o) a first clutch on the second shaft;
(p) said first clutch connecting with the first clutch gear and the second drum;
(q) said first clutch gear and said first ring gear meshing with each other;
(r) said first drum being the powered-in drum;
(s) said second drum being the powered-out drum;
(t) the driving ratio of the powered-in drum to the powered-out drum being greater than unity;
(u) a cable between said first and second drums; and,
(v) when said cable is being wound on the first drum said cable provides a reaction energy to the second drum and which reaction energy is channelled from the second drum, through the first clutch, the first clutch gear, the first ring gear, and the first set of planetary gears to the first drum to assist the first drum in the winding of the cable onto the first drum.

7. A mechanical interlock system, said system comprising:
(a) a first shaft and a second shaft;
(b) said first and second shafts being spaced apart;
(c) said first and second shafts being substantially parallel;
(d) a first pinion sun gear on said first shaft;
(e) a first set of planetary gears meshing with said first pinion sun gear;
(f) a first ring gear meshing with said first set of planetary gears;
(g) a first ring gear support journaled on said first shaft;
(h) said first ring gear support and said first ring gear being connected;
(i) a first drum on said first shaft;
(j) said first drum and said first set of planetary gears being connected;
(k) a first clutch gear on the second shaft;
(l) a second drum on the second shaft;
(m) a first clutch on the second shaft;

(n) said first clutch connecting with the first clutch gear and the second drum;
(o) said first clutch gear and said first ring gear meshing with each other;
(p) a second pinion sun gear on the second shaft;
(q) a second set of planetary gears meshing with said second pinion sun gear;
(r) a second ring gear meshing with said second set of planetary gears;
(s) a second ring gear support journaled on said second shaft;
(t) said second ring gear support and said second ring gear being connected;
(u) said second drum and said second set of planetary gears being connected;
(v) a second clutch gear on the first shaft;
(w) said second clutch gear and said second ring gear meshing with each other;
(x) a second clutch on the first shaft;
(y) said second clutch connecting with the first drum and the second clutch gear;
(z) said first drum being the powered-in drum;
(aa) said second drum being the powered-out drum;
(bb) the driving ratio of the powered-in drum to the powered-out drum being greater than unity;
(cc) a cable between said first and second drums; and,
(dd) when said cable is being wound on the first drum said cable provides a reaction energy to the second drum and which reaction energy is channelled from the second drum, through the first clutch, the first clutch gear, the first ring gear, and the first set of planetary gears to the first drum to assist the first drum in the winding of the cable onto the first drum.

8. A mechanical interlock system, said system comprising:
(a) a first shaft and a second shaft;
(b) said first and second shafts being spaced apart;
(c) said first and second shafts being substantially parallel;
(d) a first pinion sun gear on said first shaft;
(e) a first set of planetary gears meshing with said first pinion sun gear;
(f) a first ring gear meshing with said first set of planetary gears;
(g) a first ring gear support journaled on said first shaft;
(h) said first ring gear support and said first ring gear being connected;
(i) a first drum on said first shaft;
(j) said first drum and said first set of planetary gears being connected;
(k) a first clutch gear on the second shaft;
(l) a second drum on the second shaft;
(m) a first clutch on the second shaft;
(n) said first clutch connecting with the first clutch gear and the second drum;
(i) said first clutch gear and said first ring gear meshing with each other;
(p) a second pinion sun gear on the second shaft;
(q) a second set of planetary gears meshing with said second pinion sun gear;
(r) a second ring gear meshing with said second set of planetary gears;
(s) a second ring gear support journaled on said second shaft;
(t) said second carrier and said second ring gear being connected;
(u) said second drum and said second set of planetary gears being connected;
(v) a second clutch gear on the first shaft;
(w) said second clutch gear and said second ring gear meshing with each other;
(x) a second clutch on the first shaft;
(y) said second clutch connecting with the first drum and the second clutch gear;
(z) a first sprocket on the first shaft;
(aa) a second sprocket on the second shaft;
(bb) a chain connecting the first and the second sprockets;
(cc) said first drum being the powered-in drum;
(dd) said second drum being the powered-out drum;
(ee) the driving ratio of the powered-in drum to the powered-out drum being greater than unity;
(ff) a cable between said first and second drums; and,
(gg) when said cable is being wound on the first drum said cable provides a reaction energy to the second drum and which reaction energy is channelled from the second drum, through the first clutch, the first clutch gear, the first ring gear, and the first set of planetary gears to the first drum to assist the first drum in the winding of the cable onto the first drum.

9. A mechanical interlock system, said system comprising:
(a) a first shaft and a second shaft;
(b) said first and second shafts being spaced apart and parallel;
(c) a first pinion sun gear on said first shaft;
(d) a first set of planetary gears meshing with said first pinion sun gear;
(e) a first ring gear meshing with said first set of planetary gears;
(f) a first ring gear support journaled on said first shaft;
(g) said first ring gear support and said first ring gear being connected;
(h) a first drum on said first shaft;
(i) said first drum and said first set of planetary gears being connected;
(j) a first clutch gear on the second shaft;
(k) a second drum on the second shaft;
(l) a first clutch on the second shaft;
(m) said first clutch connecting with the first clutch gear and the second drum;
(n) said first clutch gear and said first ring gear meshing with each other;
(o) a second pinion sun gear on the second shaft;
(p) a second set of planetary gears meshing with said second pinion sun gear;
(q) a second ring gear meshing with said second set of planetary gears;
(r) a second ring gear support journaled on said second shaft;
(s) said second ring gear support and said second ring gear being connected;
(t) said second drum and said second set of planetary gears being connected;
(u) a second clutch gear on the first shaft;
(v) said second clutch gear and said second ring gear meshing with each other;
(w) a second clutch on the first shaft;
(x) said second clutch connecting with the first drum and the second clutch gear;
(y) a first sprocket on the first shaft;
(z) a second sprocket on the second shaft;
(aa) a chain connecting the first and the second sprockets;
(bb) a first braking system;
(cc) a second braking system;
(dd) said first braking system operatively connecting with the first drum;
(ee) said second braking system operatively connecting with the second drum;
(ff) said first drum being the powered-in drum;
(gg) said second drum being the powered-out drum;
(hh) the driving ratio of the powered-in drum to the powered-out drum being greater than unity;
(ii) a cable between said first and second drums; and,
(jj) when said cable is being wound on the first drum said cable provides a reaction energy to the second drum and which reaction energy is channelled from the second drum, through the first clutch, the first clutch gear, the first ring gear, and the first set of planetary gears to the first drum to assist the first drum in the winding of the cable onto the first drum.

10. A method for utilizing the reaction energy of a haulback drum in a hoisting machine having a main drum and said haulback drum and a cable connecting with both the main drum and said haulback drum, said main drum being the powered-in drum and said haulback drum being the powered-out drum, said method comprising:
   (a) transferring the reaction energy of the haulback drum to the main drum to assist the main drum to wind the cable on the main drum.

References Cited

UNITED STATES PATENTS 3,268,210   8/1966   Wilson _____ 254—185

DONLEY J. STOCKING, *Primary Examiner.*

H. S. LAYTON, *Assistant Examiner.*